United States Patent [19]

Lipschitz

[11] Patent Number: 5,133,562
[45] Date of Patent: Jul. 28, 1992

[54] DRAINED FACE SEAL

[75] Inventor: Abraham Lipschitz, Warwick, R.I.

[73] Assignee: EG&G Sealol, Inc., Providence, R.I.

[21] Appl. No.: 607,626

[22] Filed: Oct. 31, 1990

Related U.S. Application Data

[63] Continuation of Ser. No. 341,821, Apr. 24, 1989, abandoned.

[51] Int. Cl.⁵ .............................................. F16J 15/16
[52] U.S. Cl. .................................. 277/74; 277/81 R; 277/96.1
[58] Field of Search ............... 277/3, 15, 16, 12, 74, 277/96.1, 81 R, 87, 67

[56] References Cited

U.S. PATENT DOCUMENTS

| | | | |
|---|---|---|---|
| 1,876,515 | 9/1932 | Emmett | 277/74 |
| 2,907,594 | 10/1959 | Macks | 277/74 |
| 3,031,197 | 4/1962 | Wilkinson | 277/74 |
| 3,068,801 | 12/1962 | Murray | 415/109 |
| 3,093,382 | 6/1963 | Macks | 277/27 |
| 3,410,565 | 11/1968 | Williams | 277/3 |
| 3,640,541 | 2/1972 | Tashenberg | 277/96.1 |
| 3,675,935 | 7/1972 | Ludwig et al. | 277/27 |
| 3,751,045 | 8/1973 | Lindeboom | 277/96.1 |
| 3,759,532 | 9/1973 | Lindeboom | 277/74 |
| 3,926,442 | 12/1975 | Müller | 277/74 |
| 3,970,320 | 7/1976 | Wiese | 277/74 |
| 3,977,685 | 8/1976 | Greenawalt et al. | 277/74 |
| 4,082,296 | 4/1978 | Stein | 277/96.1 |
| 4,212,475 | 7/1980 | Sedy | 277/96.1 |
| 4,389,052 | 6/1983 | Shimuzu et al. | 277/67 |
| 4,406,459 | 9/1983 | Davis et al. | 277/25 |
| 4,421,321 | 12/1983 | Lipschitz | 277/3 |
| 4,461,987 | 7/1989 | Matsumoto | 277/74 |
| 4,511,149 | 4/1989 | Wiese | 277/3 |
| 4,523,764 | 6/1985 | Albers et al. | 277/3 |
| 4,529,209 | 7/1985 | Nii et al. | 277/3 |

FOREIGN PATENT DOCUMENTS

| | | |
|---|---|---|
| 1155004 | 10/1983 | Canada . |
| 298324 | 1/1989 | European Pat. Off. . |
| 1964150 | 7/1970 | Fed. Rep. of Germany . |
| 0920892 | 3/1963 | United Kingdom ............... 277/96.1 |
| 1108199 | 4/1968 | United Kingdom . |

OTHER PUBLICATIONS

Lipschitz, "Bi-Directional Gas Thrust Bearing", May, 1990.
World Pumps, No. 10, Oct. 1985.

Primary Examiner—William A. Cuchlinski, Jr.
Assistant Examiner—Daniel G. DePumpo
Attorney, Agent, or Firm—Finnegan, Henderson, Farabow, Garrett & Dunner

[57] ABSTRACT

A drained seal for sealing, from the ambient, a pressurized fluid in the interior of a housing fitted with a rotatable shaft and for eliminating fluid leakage along the shaft. The seal is a drained face seal that minimizes or eliminates leakage from between the sealing faces and onto the shaft. The seal includes a drain cavity formed in the stator, a drain port formed in the seal cup, a sealing dam adjacent to the drain cavity, and a tapered rotor which cooperate to prevent fluid leakage.

19 Claims, 3 Drawing Sheets

FIG. 8
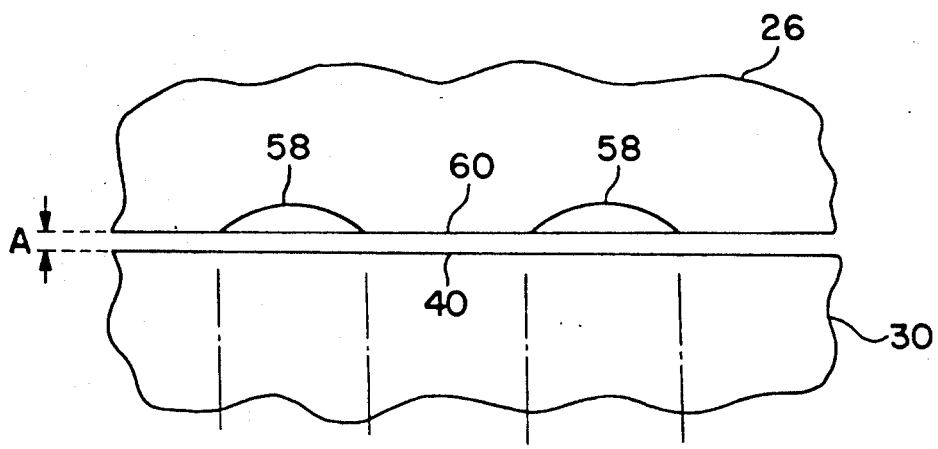
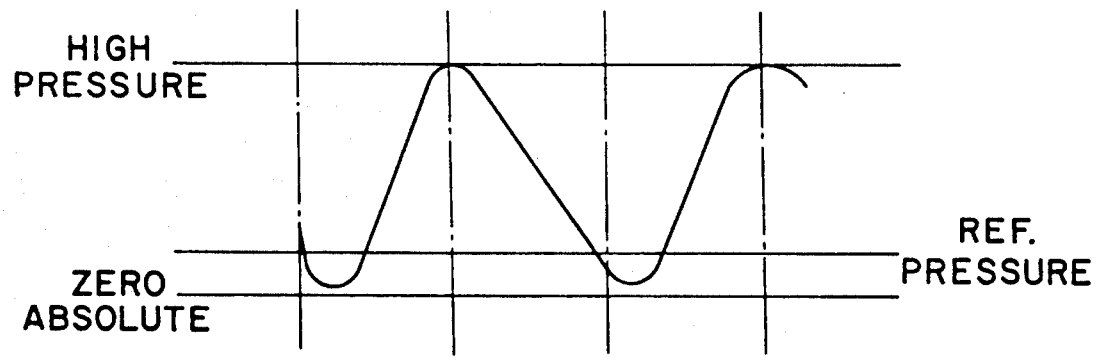
FIG. 9

DRAINED FACE SEAL

This application is a continuation of application Ser. No. 341,821, filed Apr. 24, 1989, now abandoned.

BACKGROUND OF THE INVENTION

1. Field of the Invention

The present invention relates to a drained, face seal for sealing, from the ambient, a pressurized fluid in the interior or a housing fitted with a rotatable shaft and for eliminating fluid leakage along the shaft.

2. Description of the Prior Art

The majority of seals used on rotating shafts in pressurized environments are contact seals which include a rotor fixed to the shaft and a stator fixed to the housing. In these traditional seals, when the shaft rotates the rotor and the stator physically contact and slide relative to one another. As a result, abrasion occurs between the faces of the rotor and the stator. Such contact seals, therefore, typically require lubrication on or between the rubbing faces of the rotor and stator, particularly when subjected to high pressures and excessive speeds. The lubrication between the sealing faces can and does leak toward the ambient, often onto the rotating shaft and associated bearings.

Since contact seals exhibit undesirable wear characteristics in certain circumstances, efforts have been made to produce non-contact seals having a gap formed between the rotor and the stator to thereby eliminate rubbing. Non-contact seals also present the problem of leakage of fluid between the sealing faces of the rotor and stator and onto the shaft. Conventional non-contact seals tend to leak along the shaft to a degree depending on the size of the gap maintained between the seal faces.

Some efforts to provide drainage have been made in connection with contact seals. Examples of contact seals attempting to control leakage are described in U.S. Pat. No. 4,406,459 to Davis et al. entitled Oil Weepage For Carbon Seal Plates and U.S. Pat. No. 4,529,209 to Nii et al. entitled Machine Shaft Seal with Centrifugal Removal Of Sand and Particles. These contact seals are designed, respectively, to pump out fluid into the high pressure side of the rotor and to drain water from sand particles upon the opening of a valve. Another example is U.S. Pat. No. 4,523,764 to Albers et al. entitled Fluid-Sealed Shaft Seal With Bores For Supplying and Discharging Fluid. The disclosed externally activated seal in Albers et al. has a stator which includes at least one sealing fluid supply bore and at least one fluid discharge bore for supplying and discharging buffer sealing fluid to and from the gap, to maintain a gap width. Fluid is pumped through these bores. The seal also includes spiral grooves for supplying the auxiliary sealing fluid to establish an annular zone of elevated pressure for preventing escape of the sealing fluid.

Conventional non-contact face seals have additional limitations, since they have generally utilized spiral type grooves in the face of the rotor. Examples of such seals are described in U.S. Pat. No. 4,212,475 to Sedy entitled Self Aligning Spiral Groove Face Seal. These non-contact seals are designed to function in a unidirectional manner. If the seals are driven in the opposite direction, they will not separate but will be pulled or sucked toward each other, thereby increasing wear and ultimately destroying the seal. For these and other reasons, the non-contact seals employing spiral grooves have significant limitations.

SUMMARY OF THE INVENTION

It is an object of the present invention to overcome the problems and disadvantages of the prior art by providing a drained, self activated face seal which seals, from the ambient, a pressurized fluid in the interior of the housing fitted with a rotatable shaft and minimizes, and preferably eliminates, fluid leakage to the shaft.

Another object is to provide a drained, face seal having the ability to stabilize a preselected gap size which cooperates with a drain formed in the seal to minimize leakage.

Yet another object is to provide a drained, bi-directional non-contact seal which operates when the shaft is rotating in either direction.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a seal for sealing, from the ambient, a pressurized fluid in the interior of a housing fitted with a rotatable shaft, the seal comprising a rotor fixed to the shaft for rotation with the shaft, the rotor including a first annular sealing face, a cup means attached to the housing for slidably receiving a stator for axial movement toward and away from said rotor; a stator slidably held in the cup means, the stator including a second annular sealing face substantially parallel to the first annular sealing face; the first and second sealing faces being aligned with and opposed to each other, a variable gap between the faces providing a channel for the pressurized fluid to flow toward the drain; means for preventing the rotation of the stator relative to the housing; a port cavity formed in the cup means, the port cavity including a drain opening through which fluid can exit; and a drain cavity formed in the stator and in communication at one end with the gap and ar the other end with the port cavity.

A sealing dam is provided adjacent and downstream of the drain cavity for promoting the flow of fluid in the space through the drain cavity and impeding the flow of fluid in the portion of the gap downstream of the drain cavity. The internal diameter of the rotor is preferably tapered for centrifuging fluid leaking beyond the drain cavity back toward and into the drain cavity. The seal preferably also includes a purality of grooves, more preferably radial grooves, formed in one sealing face.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description serve to explain the principles of the invention.

BRIEF DESCRIPTION OF THE DRAWINGS

FIG. 8 is a top view illustrating the relative sliding between the rotor and stator.

FIG. 9 is a circumferential pressure diagram illustrating the hydrodyanmic pressure effects created between the rotating rotor and stator of the present invention, when the rotor spins in the direction indicated.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
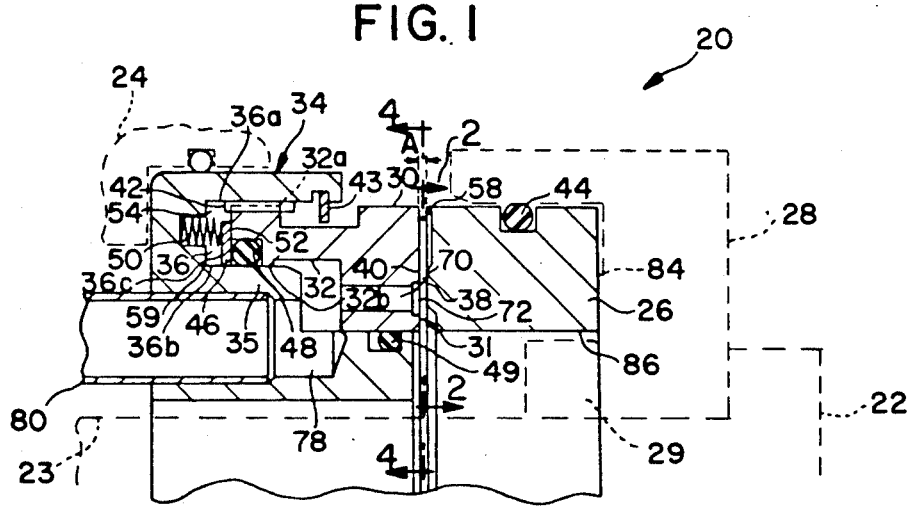
FIG. 1 is a cross-sectional view of the preferred embodiment of the drained seal of the present invention.

In accordance with the invention, a self activated drained seal for sealing, from the ambient, a pressurized fluid in the interior of a housing fitted with a rotatable shaft is provided. As shown in FIG. 1, drained, seal 20 of the present invention serves to provide a seal between a high pressure environment located at one side of a rotating shaft 22 and a low pressure or ambient environment located at the other side of shaft 22. The high pressure environment, shown in FIG. 1, is enclosed within a machine housing 24 and located to the exterior of shaft 22 and seal 20. An ambient pressure environment is located to the left of the machine housing 24 and along the outside diameter 23 of shaft 22 proximate seal 20.

In accordance with the invention, a rotor is fixed and sealed against the shaft for rotation with the shaft, and the rotor includes a first annular sealing face substantially perpendicular to the shaft. As embodied herein, seal 20 includes a circumferential rotor 26 having a sealing face 38. Preferably, a rotor carrier 28 is fixed to the shaft by nut 29 and sized to receive rotor 26.

In accordance with invention, a stator is held to the housing and includes a second annular sealing face substantially perpendicular to the shaft. As embodied herein, stator 30 includes a rear portion 32 having top and bottom surfaces, 32a and 32b, respectively, and a sealing face 40 located opposite the rear portion 32. Stator 30 is housed within a U-shaped cup 34 affixed to housing 24 by conventional means. Cup 34 forms an elongated cup recess 36 having top, bottom and rear walls 36a, 36b and 36c, respectively, into which the rear portion 32 of stator 30 is slidably received for axial movement in response to force imparted thereon. As shown in FIG. 1, top surface 32a can slide along top wall 36a, and bottom surface 32b can ride along the bottom wall 36b of cup recess 36. A recess 46 may be formed along bottom surface 32b of rear portion 32. As a result, bottom surface 32b may be shorter in length than top surface 32a of stator 30.

In the preferred embodiment of the present invention, cup 34 is made from metal, stator 30 is made of carbon/graphite, and rotor 26 is made of a hard wear resistant material such as silicon carbide.

Figure 2:
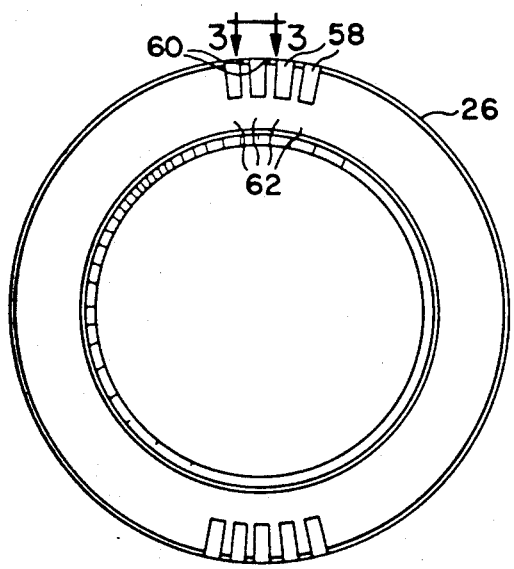
FIG. 2 is a frontal view taken along the lines 2—2 shown in FIG. 1 illustrating the sealing face of the rotor of the present invention.
Figure 4:
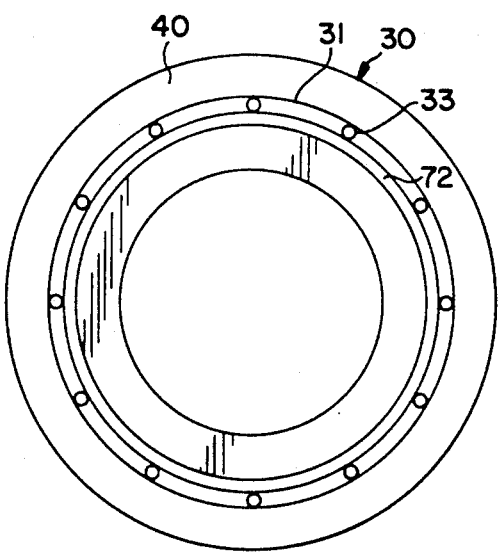
FIG. 4 is a frontal view taken along the lines 4—4 shown in FIG. 1, and illustrates the sealing face of the stator.
Figure 3:
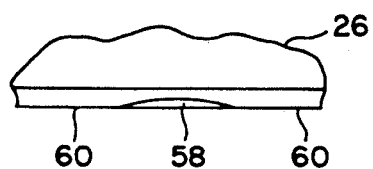
FIG. 3 is a top view taken along the lines 3—3 illustrating the cross-sectional view of the radial grooves formed in the rotor of the present invention.

In accordance with the invention, the first rotor sealing face and second stator annular sealing faces are aligned with and opposed to each other, and a gap between the stator and rotor provides a channel for the fluid to flow toward a drain cavity 70. As shown in FIG. 1, rotor 26 and stator 30 are aligned with and opposed to each other so that a variable distance referred to as gap A is located at their interface. As shown in FIG. 2, the rotor 26 includes an annular rotor sealing face 38 at the interface which is substantially perpendicular to the axis of shaft 22. Similarly as shown in FIG. 4, at the interface area stator 30 includes an annular stator sealing face 40.

In accordance with the invention, means are provided for preventing the rotation of the stator relative to the housing. Preferably, the stator rotation prevention means includes an anti-rotational lug 42 that may be attached to or made integral with cup 34. Lug 42 cooperates with one or more slots formed in stator 30 to prevent stator 30 from rotating relative to housing 24. Further, retainer 43 can be provided to secure the positioning of stator 30 and prevent dislodging of such under the influence of spring 50.

In accordance with the invention, sealing means is provided for substantially preventing the flow of pressurized fluid to ambient in areas other than in gap A. As embodied herein and as shown in FIG. 1, static seal 44 is fit within an annular groove formed in the outer circumference of rotor 26 and fits snugly against the inner wall of rotor carrier 28. Preferably, static seal 44 is in the form of an elastomeric 0-ring acting as a seal to prevent or minimize leakage along the exterior surface of rotor 26. The rotation of shaft 22 causes the joint rotation of the following elements: shaft 22, rotor carrier 28, rotor 26, and static seal 44. As described more fully below, to the extent any fluid leaks through the seal and toward the ambient, a taper on the inside diameter of the rotor tends to return the fluid back toward the drain provided by the present invention.

As shown in FIG. 1, the sealing means also includes secondary seal 48 formed between the bottom surface 32b of stator 30 and cup 34. Secondary seal 48 forms a seal between stator 30 and cup skirt 35. Preferably, secondary seal 48 is formed of an elastomeric O-ring. Secondary seal 48 can fit within recess 46 formed at the bottom surface 32b of stator 30. Secondary seal 48 is held in place by a securing means that is biased by spring 50 against the rear pressure face 52 of rear portion 32. As described below, if fluid does leak past the secondary seal 48, it is transferred directly to the drain.

In accordance with the invention, drainage means is formed adjacent the gap between the sealing faces for draining discharged fluid between said faces and minimizing or eliminating the leakage through the gap and onto the shaft. As embodied herein and shown in FIGS. 1 and 4, the drainage means includes drain cavity 70 formed in stator 30 and in communication with gap A for conveying fluid away from gap A and shaft 22. Preferably, drain cavity 70 includes an annular recess 31 formed in the sealing face 40 of the stator and a plurality of drain channels or bores 33 which are spaced along that channel. The drain channels 33 are tubular and are axially aligned with the axis of the stator.

In accordance with the invention, the cup 34 includes a drain port, and the stator is slidably held by the cup so that the drain cavity and the drain port are in fluid communication. As embodied herein and shown in FIG. 1, a drain port 78 is formed in cup 34. Drain port 78 is in fluid communication with drain cavity 70 for accepting pressurized fluid leakage from the gap and through the drain cavity. Drain port 78 is also in fluid communication with the interface between stator 30 and the cup 34 to capture any pressurized fluid that may leak across seal 48 along that interface.

A drain tube 80 maybe placed into fluid communication with drain port 78 for transferring the fluid leakage away from the port to an unpressurized (relative to ambient) waste area or a reservoir, not shown. Depending on the desired end use, the fluid leakage can be reapplied to a closed seal system or thrown away as waste. In either event, the drain cavity 70, the drain port 78, and the drain tube 80 direct fluid leakage away from the shaft. To eliminate the fluid discharged through drain port 78 from dripping on the shaft, seal 49 is provided between cup 34 and stator 30. Hence seals 48 and 49 enclose the drainage passage and allow fluid flow from cavity 70 to tube 80 only.

The present invention also contemplates the use of suction mechanism, such as a pump, which can apply suction to the drain tube, drain port, and drain cavity in order to further promote the flow of fluid through the drain and away from the shaft. In most circumstances, however, the present invention will not require the use of such an additional element, as long as no meaningful pressure differential between the ambient and the fluid in the drain cavity exists. The centrifuging of the fluid into the drain cavity further insures elimination of leakage onto the shaft.

As shown in FIG. 1, an annular sealing dam 72 is provided adjacent and radially downstream of drain cavity 70 for promoting the flow of fluid at the interface area or in gap A through drain cavity 70. The sealing dam 72 is in the form of a second annular sealing face which is aligned and cooperates with the sealing face of the rotor. As a result, the stator has in effect two sealing faces, and the second sealing face also provides a dam downstream of the drain cavity. Consequently, the flow of fluid in the portion of gap A is impeded from traveling downstream of drain cavity 70.

In accordance with the invention, the inside diameter of the rotor is tapered for impelling fluid leaking beyond the drain cavity back toward and into the drain cavity. As shown in FIG. 1, rotor 26 is machined at an angle such that the inside diameter of the rotor end 84 opposite to rotor sealing face 38 is smaller than the inside diameter at sealing face 38 to form a taper 86. Taper 86 preferably runs the full axial length of rotor 26 and slopes at an angle of 2-5° relative to the axis of the rotor. If fluid leaks beyond the sealing dam 72 onto the rotor, leakage is subjected to a centrifugal force which forces the leaked fluid back into the gap and toward and through drain cavity 70. The leaked fluid is thus prevented from coming into contact with shaft 22. The fluid leakage acted upon by taper 86 is primarily fluid that originates from the interface area and does not initially flow through drain cavity 70. However, taper 86 can also aid in redirecting fluid that leaks across the top surface of rotor 26, past static seal 44, and fluid that leaks past the rear portion of the rotor.

In accordance with the invention, means is provided for biasing the stator and its second annular sealing face toward the rotor and its first annular sealing face. As embodied herein, the biasing means includes spring 50, rear pressure face 52 of the stator, and fluid channel 54. When the housing is not pressurized, the spring presses the stator toward the rotor. As the housing is pressurized, a hydrostatic force is imparted upon the rear pressure face 52. That force biases the stator toward the rotor. The variables factored into the resultant hydrostatic force include among other things the size of the rear pressure face 52 and the fluid channel 54. The stator can be designed to be subjected to a given hydrostatic force for a given preselected operating pressure. The net of hydrostatic forces acting on the stator can be changed by adjusting the surface area of rear pressure face 52. The surface area of rear pressure face 52 can be altered by varying both the diametral size of stator 30 and recess 46 formed in stator 30.

Fluid channel 54 is located within the boundaries of the top and rear walls of cup 34 and surrounding the top and back surfaces, 32a and 52 of rear portion 32 of stator 30. Fluid channel 54 provides the pressurized fluid in the housing direct access to rear pressure face 52. The fluid channel allows high pressure fluid to surround the top and sides of stator 30. In this way, high pressure fluid forces are blocked off between stator 30 and cup skirt 35 and biases stator 30 against rotor 26. Consequently, an increase in the pressure of the pressurized fluid causes an increase in the force acting on rear pressure face 52. Similarly, the hydraulic fluid force imparted on the stator for a given pressure can be varied by changing the surface area of the rear pressure face 52 by changing the diameter of skirt 35 and neighboring parts.

In the preferred embodiment the seal also includes a spring 50 which fits within a recess formed in rear wall 36c of cup recess 36. The spring exerts a static force by indirectly acting against rear pressure face 52 to press stator and rotor sealing faces 38 and 40 into engagement. As shown in FIG. 1, spring 50 presses against a protection washer 51 which is in contact with the rear pressure face 52. The static force exerted by spring 50 rapidly becomes negligible in magnitude (compared to the hydrostatic force) as the seal is subjected to operating conditions.

In accordance with the invention, gap positioning means is provided for producing a gap dependent force to cause the gap between the rotor and stator to stay within a preselected range regardless of the directional rotation of the rotor, thereby providing a bi-directional non-contact seal. As embodied herein the gap positioning means produces a controlled interface lifting force acting on the sealing faces. The gap positioning means includes a plurality of radial grooves 58 formed in rotor sealing face 38 for fluid communication with the pressurized fluid. The present invention contemplates as an alternative embodiment forming a plurality of radial grooves in stator sealing face 40. The radial grooves, as shown, are symmetrical about a radial line of rotor sealing face 38 and preferably have a curved cross-sectional configuration. However, grooves having different cross section, such as square cross sections, could be used. The plurality of radial grooves are spaced from one another so that a plurality of lands 60 are located therebetween. Radial grooves 58 and lands 60 are preferably of uniform width, respectively. Further, in the preferred embodiment the width of radial grooves 58 is approximately equal to the width of lands 60. Radial grooves 58 preferably have a width within the range of 0.1 to 0.5 inches and have a depth within the range of 200 to 1000 millionths of an inch.

As shown in FIG. 1, radial grooves 58 extend inwardly from the outer periphery of rotor sealing face 38 a distance less than the radial span of rotor sealing face 38. The remaining portion of rotor sealing face 38 provides a sealing dam 62 radially downstream to radial grooves 58. As a result, the radial dam tends to impede the flow of leaking fluid to the drain cavity, thereby minimizing leakage lost to drain. The remaining portion of sealing dam 62 faces the drain cavity 70 and sealing dame 72 which empedes the leakage flow from the drain cavity 31 onto the shaft.

The seal of the present invention represents a seal capable of producing and maintaining a proper preselected gap or space between rotor and stator sealing faces as a result of the net force generated by the closing and opening forces operating on the seal. The seal is specifically configured to generate self-restoring closing and opening forces capable of producing a predetermined proper gap between the sealing faces.

The closing force acting on the seal is primarily a function of the magnitude of pressure acting on the left side of stator 30, although the force provided by spring 50 also tends to push or slide the stator toward the rotor. This spring force, however, is fairly constant, and the magnitude of the spring force becomes insignificant, when the seal is subjected to high pressure. The major variables factored into the net hydrostatic closing pressure acting on the stator include the operating pressure and the area of rear pressure face 52 against which the pressure acts. The magnitude of the closing pressure force can be varied by altering the inside diameter of the secondary seal 48 together with the diameter of cup skirt 35 thereby either enlarging or decreasing the surface area subjected to hydrostatic forces.

Spring 50 serves to keep the rotor sealing face 38 and stator sealing faces 40 and dam 72 together when the machine is not running. The force produced by spring 50 is very small in comparison to the hydrostatic pressure load. Once the machine is pressurized, the pressure force quickly exceeds the spring force.

The opening force placed on the seal is a function of a variety of variables, including the width and length of radial grooves 58, the cross-sectional geometry of radial grooves 58, the pressure of the pressurized fluid, the speed of shaft 22, the size of the gap between the sealing faces, and fluid viscosity. As described more fully below, even when the sealing faces are in contact, pressurized fluid will fill the grooves and create an opening force at the interface of the grooves and the opposing sealing face. The radial grooves are sized so that, as the pressure increases to operating pressure, the opening or lifting force at the interface of the grooves and the sealing face will open the sealing faces and create a gap. Once a gap is formed between the sealing faces, pressurized fluid will create a gap dependent hydrostatic opening force over the entire area of the sealing interface. As described more fully below, the gap-dependent hydrostatic forces tend to cause the sealing faces to float at operating pressures. In addition, when the stator and rotor rotate relative to one another, hydrodynamic opening forces are developed because of fluid shear between the sealing faces in the vicinity of the radial grooves, as shown in FIGS. 8 and 9. The magnitude of this hydrodynamic force is a function of, inter alia, the radial groove structure of the present invention, the properties of the pressurized fluid, and the size of the space between the rotor and stator. The closing and opening forces are interrelated since the magnitude of the hydrostatic and hydrodynamic forces varies relative to the size of the gap.

Under operating conditions, the seal of the present invention creates the proper gap size by essentially equalizing the counteracting hydraulic forces operating thereon. In the preferred embodiment, the seal is designed so that the gap size is typically approximately 100 millionths of an inch. As will be described more fully below with reference to FIGS. 5A, 6A, 7A and 9, the hydrostatic and hydrodynamic forces acting at the interface of rotor and stator sealing faces 38 and 40 vary, depending upon the gap size. The hydrodynamic force is highly sensitive or reactive to the particular gap size. Generally, a small gap size results in high hydrodynamic and hydrostatic opening forces while a large gap size results in lower opening forces. Extremely high hydrodynamic forces are developed when the rotor and stator almost touch. The seal of the present invention thus ensures a non-contact seal at operating pressure and speed.

The seal of the present invention is designed so that as pressure becomes signficant relative to the load applied by spring 50, a self-restoring hydrostatic balance is achieved whereby stator 30 effectively floats on a fluid film. When the sealing faces are initially at contact and are not sliding relative to one another, the force pressing the stator toward the rotor is the sum of the spring force and the integral of the pressure acting over the rear pressure face 52 of the stator. The force tending to press the stator away from the rotor is the integral of the pressure acting on the contacting sealing faces, at the radial grooves 58. This condition is shown generally in FIG. 5. The seal is designed so that at operating pressure, the opening force at the interface of the sealing faces slightly overcomes the closing force, thereby creating a slight gap between the sealing faces.

Figure 6:
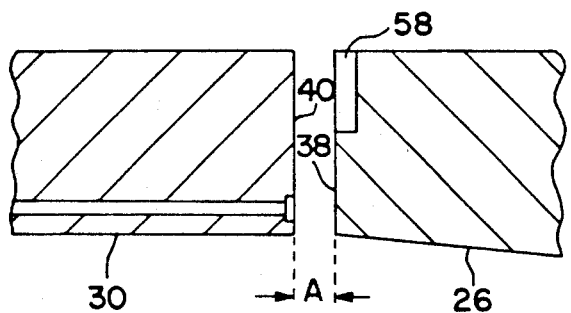
FIG. 6 is a partial cross-sectional view of the stator and rotor separated by a large gap.
Figure 6A:
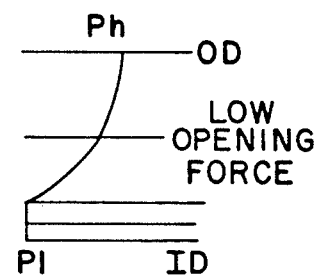
FIG. 6A is a pressure diagram illustrating the hydrostatic pressure distribution on the sealing faces illustrated in FIG. 6.
Figure 7:
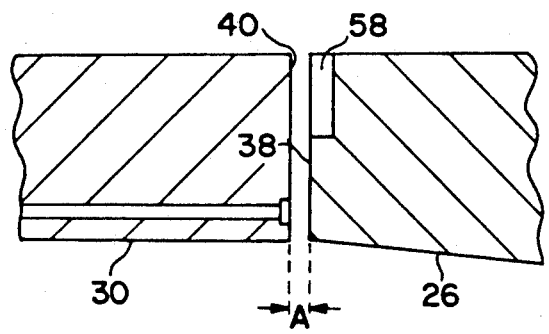
FIG. 7 is a partial cross-sectional view illustrating a stator and rotor separated by a proper gap.
Figure 7A:
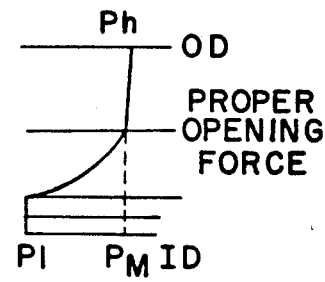
FIG. 7A is a pressure diagram illustrating the hydrostatic pressure distribution on the sealing faces illustrated in FIG. 7.

As shown in FIGS. 6-7A, the pressure distribution profile changes when the gap opens. As depicted in FIG. 6A, the hydrostatic opening force decreases if the gap between the sealing faces becomes too large. At the proper gap size, the hydrostatic opening and closing forces balance and as shown in FIGS. 7 and 7A, the sealing faces float on a fluid film.

When shaft 22 rotates and the rotor and stator are too close together, the hydrodynamic forces generated by the fluid shearing between the sliding surfaces of rotor and stator sealing faces 38 and 40 produce an opening force. Specifically, radial grooves 58 cause fluid to vary its viscous dominated flow in response to the precise geometric configuration thereof. The change in the viscous dominated flow of the fluid causes a circumferential pressure change which in turn alters the gap size. As the gap size increases, the hydrodynamic force descreases, as explained further with reference to pressure profiles depicted in FIG. 9. As a result, if the gap becomes too large, the sealing faces tend to close.

Figure 5:
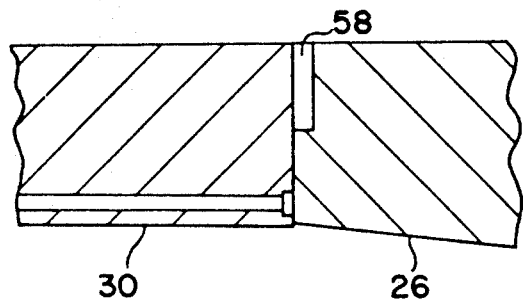
FIG. 5 is a partial cross-sectional view illustrating the sealing surfaces of the stator and rotor at contact.

The hydrostatic and hydrodynamic forces acting upon rotor and stator seal faces 38 and 40 at the radial groove area can be more fully understood by reference to FIGS. 5-7 and FIGS. 8-9, respectively. Regarding FIGS. 5-7 illustrating hydrostatic forces, the hydrostatic opening force can be determined by integrating the pressure distribution over the area. The pressure at any point is a function of among other things, the gap size, the pressure of the fluid, and the geometry of the radial grooves.

Figure 5A:
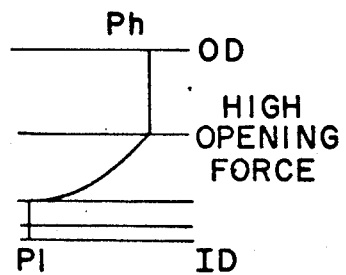
FIG. 5A is a pressure diagram illustrating the hydrostatic pressure distribution upon the sealing faces illustrated in FIG. 5.

FIGS. 5 and 5A illustrate the hydrostatic effects on rotor and stator sealing faces 38 and 40, at the state where rotor 26 and stator 30 are for practical purposes in contact. At this stage, there is no fluid flow from the OD side to the ID side. Thus, the pressure on the sealing faces at the radial groove location is a constant $P_h$, representing the maximum pressure of the fluid. The pressure across the sealing dam beyond the radial groove area and between the sealing faces gradually decreases from $P_h$ to $P_l$, the drain pressure which is preferably equal to the ambient pressure.

FIGS. 6 and 6A illustrate the hydrostatic effects on rotor and stator sealing faces 38 and 40 having a large gap, large being relative to radial groove depth, between the respective sealing faces. As the gap size becomes large, in contrast to FIG. 5A, the fluid flow becomes insensitive to the presence of the radial grooves resulting in relatively continuous pressure drop over a large area. The pressure profile of FIG. 6A shows a pressure decrease more smooth or continuous from $P_h$ at the outer perimeter of the respective sealing faces to $P_l$ at the outside diameter of drain cavity 70 which is at substantially ambient pressure.

FIGS. 7 and 7A illustrate the hydrostatic effects on rotor and stator sealing faces 38 and 40 when the predetermined proper gap of the present invention is formed between the respective sealing faces. As shown, the pressure along the grooves decreases slightly from $P_h$ to $P_m$, and the pressure below the grooves changes more rapidly from $P_m$ to $P_l$.

As high pressure fluid fills the plurality of radial grooves 58, the pressure acts against the sealing faces of the grooves and creates a hydrostatic opening force. To balance the proper hydrostatic opening force which acts on the stator interface, an equivalent and opposite in direction hydrostatic closing force acts on the rear pressure face 52 of stator 30. For a given operating pressure, this closing force is determined by specifying the appropriate diameter for cup skirt 35. This diameter defines the location and size of secondary seal 48 and, hence, the surface area subject to a constant hydrostatic closing force. In general, the hydrostatic pressure force is much larger than the spring force. When the gap becomes large, the hydrostatic interface opening force is small compared to the constant closing force and the gap decreases. When the gap closes, the hydrostatic interface opening force overcomes the closing force. Therefore, a complete hydrostatic self restoring force balance is reached when the seal operates with a proper gap.

FIGS. 8 and 9 show the hydrodynamic forces at the radial groove area of the present invention. In operation, stator sealing face 40 is stationary, while the rotor sealing face 28 rotates or slides relative to stator 30. The fluid located between the sealing faces is dragged in the direction of moving rotor 26. As fluid goes from the edge to the deeper radially rounded area of the radial groove, the fluid film experiences an expansion. As a result, the pressure of the fluid drops. The pressure drop, however, is limited by the laws of physics, namely, a pressure drop below absolute zero (negative one atmosphere) is impossible. Once the fluid passes the deepest radial groove area, the fluid is compressed causing a rise in pressure. The pressure rise is dependent upon the speed, the film thickness and the viscosity of the fluid and, in contrast to the pressure drop, is not limited in magnitude. The net opening pressure is larger in magnitude than the ambient or reference pressure because the pressure rise is larger than the pressure drop. This explains why, as shown in FIG. 9, the net opening force created by the grooves increases as the speed of the rotor increases. It has further been found that the net opening force increases as the gap between the faces decreases. This hydrodynamic opening force combines with the hydrostatic opening force when relative sliding motion takes place between the sealing surfaces. This effect further ensures that no face contact will occur between the stator and the rotor.

Other embodiments of the invention will be apparent to the skilled in the art from consideration of the specification and practice of the invention disclosed herein. It is intended that the specification and examples be considered as exemplary only, with a true scope and spirit of the invention being indicated by the following claims.

What is claimed is:

1. A seal for sealing, from the ambient, a pressurized fluid in the interior of a housing fitted with a rotatable shaft, the seal comprising:

a rotor fixed to the shaft for rotation with the shaft, said rotor including a first annular sealing face, said first sealing face being oriented substantially orthogonally to the axis of the rotatable shaft, the first sealing face having an outer and inner diameter;

cup means attached to the housing for slidably receiving a stator for axial movement toward and away from said rotor;

a stator held in said cup means, said stator including a second annular sealing face substantially parallel to said first annular sealing face, said second sealing face having an outer and inner diameter;

said first and second annular sealing faces being aligned and opposed to each other;

a plurality radial grooves formed in one of said sealing faces for producing a gap between said first and second annular sealing faces in response to relative rotation between the first and second annular sealing faces, the grooves having a curved shape with respect to a radial cross-section, said radial cross-section having a dimension defining the width of each groove, said radial groove having a depth, said width being greater than the depth of said groove, the grooves extending a portion of the distance between the inner and outer diameter and the grooves being in fluid communication with the pressurized fluid, the grooves creating a gap dependent force to cause said faces to move away from each other and maintain a variable gap between said faces regardless of the direction of the rotation, the gap providing a channel for the pressurized fluid to flow from the interior in a downstream direction toward the ambient, each groove being isolated form the remaining of said plurality of grooves by a continuous land surface;

means for preventing the rotation of said stator relative to the housing;

a drain port formed in said cup means, said drain port including a drain opening through which pressurized fluid can exit; and a drain cavity formed in said stator and in communication at one end of said gap and at the other end with said drain port.

2. The seal of claim 1 further comprising a sealing dam provided adjacent and radially downstream of said drain cavity for promoting the flow of fluid in said gap through said drain cavity and impeding the flow of fluid in the portion of said gap radially downstream of said drain cavity.

3. The seal of claim 1 wherein at least a portion of the internal diameter of said rotor is tapered for forcing fluid leaking beyond said drain cavity back toward and into said drain cavity.

4. The seal of claim 3 further comprising a sealing dam means provided adjacent and radially downstream of said drain cavity for promoting the flow of fluid in said gap through said drain cavity and impeding the flow of fluid in the portion of said gap radially downstream of said drain cavity.

5. The seal of claim 1 wherein said cup means includes a top channel which places the rear portion of the stator in fluid communication with said pressurized fluid, said stator has an interface with and is sealed against the bottom surface of said cup means, and said drain port is in fluid communication with the interface between said stator and said bottom surface to capture any pressurized fluid that may leak along that interface.

6. The seal of claim 5 wherein said rotor has an axially tapered surface positioned adjacent and radially downstream of said drain cavity and tapering toward said drain cavity for impelling pressurized fluid leaking beyond said drain cavity back toward and into said drain cavity.

7. The seal of claim 6 wherein said axial taper of said rotor forms any angle in the range of 2 to 5 degrees relative to the axis of said rotor.

8. The seal of claim 1 wherein said drain cavity is formed proximate the downstream end of said stator.

9. The seal of claim 1 wherein said radial grooves have a depth less than or equal to 0.001 inch.

10. A seal for sealing, from the ambient, a pressurized fluid in the interior of a housing fitted with a rotatable shaft, the seal comprising:
- a rotor fixed to the shaft for rotation with the shaft, said rotor including a first annular sealing face, said first sealing face being oriented substantially orthogonally to the axis of the rotatable shaft, the first sealing face having an outer and an inner diameter;
- a stator held to the housing, said stator including a second annular sealing face substantially parallel to said first annular sealing face, said second sealing face having an outer and an inner diameter;
- said first and second annular sealing faces being aligned with and opposed to each other;
- a plurality of radial grooves formed in one of said sealing faces for producing a gap between said first and second sealing faces in response to relative rotation between the first and second annular sealing faces, the grooves having a curved shaped with respect to a radial cross-section, said radial cross-section having a dimension defining the width of each groove, said groove having a depth, said width being greater than the depth of said groove, the grooves extending a portion of the distance between the outer and inner diameter and the grooves being in fluid communication with the pressurized fluid, the grooves creating a gap dependent force to cause said faces to move away from each other and maintain a variable gap between said faces regardless of the direction of the rotation, the gap providing a channel for the pressurized fluid to flow from the interior in a downstream direction toward the ambient, each groove being isolated form the remaining of said plurality of grooves by a continuous land surface;
- means for preventing the rotation of said stator relative to the housing;
- a drain cavity formed in said stator and in communication at one end with said gap and in communication at the other end with an exit port through which fluid can exit; and
- means for impelling fluid leaking beyond said drain cavity back toward and into said drain cavity, the impelling means including an axial taper formed on the inside diameter of said rotor, positioned adjacent and radially downstream of said drain cavity, and tapering toward said drain cavity.

11. The seal of claim 10 further comprising sealing dam means provided adjacent and radially downstream of said drain cavity for promoting the flow of fluid in said gap through said drain cavity and impeding the flow of fluid in the portion of said gap radially downstream of said drain cavity.

12. The seal of claim 10 wherein said sealing faces are substantially perpendicular to the shaft and said drain cavity is positioned proximate the inner periphery of said stator.

13. The seal of claim 10 further comprising a cup means which slidably holds said stator at an interface and includes a drain port having a drain opening and wherein said drain port is in fluid communication with the interface of said cup means and said stator to capture any pressurized fluid that leaks along that interface.

14. A seal for sealing, from the ambient, pressurized fluid in the interior of a housing fitted with a rotatable shaft, the seal comprising:
- a rotor fixed to the shaft for rotation with the shaft, said rotor including a first annular sealing face substantially perpendicular to the shaft;
- cup means attached to the housing for slidably receiving a stator for axial movement toward and away from said rotor, said stator including a second annular sealing face substantially perpendicular to the shaft and rear portion which is received by said cup means;
- said first and second annular sealing faces being aligned with and opposed to each other, a gap between said faces providing a channel for fluid to flow from the interior in a downstream direction toward the ambient;
- mean for preventing the rotation of said stator relative to the housing;
- sealing means for substantially preventing the flow of fluid to the ambient between said cup means and said stator;
- drainage means adjacent to said gap draining the fluid between said sealing faces and minimizing the leakage of the fluid through said gap and onto the shaft, said drainage means including a drain cavity formed in said stator;
- hydrostatic means for pressing said second annular sealing face toward engagement with said first annular sealing face; and
- a plurality of radial grooves formed in one of said first and second annular sealing faces for producing a variable force responsive to rotation of the shaft and regardless of the direction of the rotation to cause said first and second annular sealing faces to move away from each other and maintain the size of said gap within a preselected range, said grooves extending a portion of the distance between the inner and outer diameter and the groove having a curved shape with respect to the radial cross-section, said radial cross-section having a dimension defining the width of each groove, said groove having a depth, said width being greater than the depth of said groove, each groove being isolated from the remaining of said plurality of grooves by a continuous land surface.

15. The seal of claim 14 wherein said radial grooves have a width with the range of 0.1 to 0.5 inches and a depth with the range of 200 to 1000 millionths of an inch.

16. The seal of claim 15 wherein said hydrostatic means includes a fluid channel formed in said cup means for providing the pressurized fluid direct access to the rear of said stator.

17. The seal of claim 16 wherein a drain port is formed in said cup means, said drain port including a drain opening through which fluid can exit.

18. The seal of claim 17 wherein the rotor has axially tapered surface on its inside diameter adjacent and radially downstream of said drain cavity and tapering toward said drain cavity for impelling pressurized fluid leaking beyond said drain cavity back toward and into said drain cavity.

19. The seal of claim 18 further comprising a sealing dam provided adjacent and radially downstream of said drain cavity for promoting the flow of pressurized fluid in said gap through said drain cavity and impeding the flow of pressurized fluid in the portion of said gap radially downstream of said drain cavity.

* * * * *